Patented Dec. 9, 1947

2,432,114

UNITED STATES PATENT OFFICE 2,432,114

ANTIVESICANT PREPARATIONS

Carl B. Marquand, Columbus, Ohio, and Thomas W. Kethley, Decatur, Ga.

No Drawing. Application June 3, 1944, Serial No. 538,672

5 Claims. (Cl. 167—72)

(Granted under the act of March 3, 1883, as amended April 30, 1928; 370 O. G. 757)

The invention described herein may be manufactured and used by or for the Government for governmental purposes, without payment to us of any royalty thereon.

This invention relates to anti-vesicant solutions which are effective in therapeusis and prophylaxis of liquid lewisite burns of the skin. More particularly, the invention relates to anti-vesicant solutions prepared by dissolving a solid inorganic peroxygen compound and sulfamic acid in water.

In the past, aqueous solutions of hydrogen peroxide have been used effectively in the treatment of skin burns from chlorovinyl dichloro arsine (lewisite). Aqueous solutions having a concentration of about eight per cent hydrogen peroxide have usually been employed since, at this concentration, such solutions are relatively stable and possess a high therapeutic efficiency. These solutions are especially adapted for use at manufacturing plants and storage depots where large quantities thereof may be conveniently and frequently prepared. It is impractical, however, to use such solutions in the field under combat conditions owing to the fact that the solutions occupy a large amount of shipping and storage space and are difficult to handle. In order to overcome these objections, attempts have been made to use solid compositions which, when dissolved in water, release hydrogen peroxide and provide anti-vesicant solutions equivalent in their therapeutic properties to standard solutions of hydrogen peroxide. Heretofore, such attempts have been unsuccessful due to either the low solubility of solid peroxygen compounds or the tendency of the latter to resolidify after having been brought into solution.

One object of this invention is to provide an aqueous antivesicant solution of a solid inorganic peroxygen compound which is therapeutically equivalent to standard aqueous hydrogen peroxide anti-vesicant solutions.

Another object of this invention is to provide an aqueous anti-vesicant solution of a solid inorganic peroxygen compound and sulfamic acid in which the active oxygen is released rapidly from the solid peroxygen compound in solution.

Still another object of this invention is to provide an aqueous anti-vesicant solution of a solid inorganic peroxygen compound and sulfamic acid from which the peroxygen compound has no tendency to resolidify.

A further object of this invention is to provide an aqueous anti-vesicant solution of a solid inorganic peroxygen compound and sulfamic acid which is free from ions which depress the therapeutic action of the solution on the skin.

A still further object of this invention is to provide a simple and economical process for the production of aqueous anti-vesicant solutions of solid inorganic peroxygen compounds which are therapeutically equivalent to standard aqueous hydrogen peroxide anti-vesicant solutions.

Other objects will be apparent from the following description of the invention.

These objects are accomplished by the following invention which comprises preparing aqueous anti-vesicant solutions by dissolving a solid inorganic peroxygen compound and sulfamic acid in water or by dissolving a peroxygen compound in an aqueous solution of sulfamic acid. Solid peroxygen compounds generally, may be employed in carrying out the invention though members of the class of alkali metal and alkaline earth metal perborates and peroxides, metal percarbonates, persulfates, and perphosphates are preferred. The choice of a peroxygen compound is limited by the requirement for a compound having a high peroxide content which is stable and retains its active oxygen content during long periods of storage, even at elevated temperatures. It is preferred to employ for the purposes of this invention either sodium phyrophosphate peroxide, sodium perborate monohydrate $$(NaBO_2 \cdot H_2O_2)$$

or sodium perborate peroxide 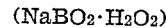($NaBO_2 \cdot 2H_2O_2$). The commercial grades of sodium perborate monohydrate usually contain approximately 34 per cent $H_2O_2$. Sodium perborate peroxide contains approximately 52 per cent $H_2O_2$ and may be prepared by adding sodium perborate (U. S. P.) to 30 per cent hydrogen peroxide with stirring at a temperature of from 40°–50° C. When the perborate has completely dissolved, the solution is cooled and the fluid removed by drying in vacuo. These peroxides are highly stable compounds and retain more than 75 per cent of their peroxide content after storage for three months at 50° C.

In preparing the anti-vesicant solutions comprising this invention, it has been found that solid peroxygen compounds such as sodium perborate monohydrate and sodium perborate peroxide are characterized by low solubilities in water. Aqueous solutions of these compounds possessing therapeutic value are difficult or impossible to prepare and solutions which are obtained are further characterized by low active oxygen content as well as the tendency of the peroxygen compound to resolidify. It has been generally known that the solubility characteristics of solid peroxygen compounds may be improved by the addition of inorganic acids to solutions thereof. These acids, however, usually produce a depressant action upon the therapeutic activity of the solutions with the result that the clinical use of such solutions in treating lewisite skin burns is impractical. Furthermore, these acids are rarely obtainable in solid form and are often very unstable or weakly acid. This invention is based on the discovery that sulfamic acid possesses none of the foregoing objections and may be used to increase the solubility of solid peroxygen compounds in water as well as promote the rapid release in solution of the active oxygen content of the peroxygen compound. Sulfamic acid is an extremely stable solid acid which may be easily packaged in non-breakable containers of non-critical materials for long periods of time without affecting its activity. Crystals of this acid have been kept for years at room temperature without change and in an oven at 60° C. for six months without deterioration. It is, furthermore, strongly acid and the weight thereof required to dissolve a peroxygen compound is smaller than that required in the case of less highly ionized acids.

The anti-vesicant solutions comprising this invention have been found to possess their highest therapeutic efficiency at pH values of approximately 8.0 or lower. At higher pH values as, for example from 8.0 to 12.0, the indices of relative injury occurring during treatment of lewisite skin burns increase. In preparing the solutions, the amounts of solid peroxygen compound and sulfamic acid employed are interdependent. Thus, the relative proportions of these ingredients are selected so that a solution is obtained, the active oxygen content of which is equivalent to that of an eight per cent hydrogen peroxide solution and the pH value of which is 8.0 or lower. The active oxygen content of the solid peroxygen compound and the degree with which sulfamic acid causes the compound to release its active oxygen are controlling factors. The latter factor varies with the peroxygen compound employed, but usually the amount of sulfamic acid employed to prepare a therapeutically efficient solution ranges from about one part of sulfamic acid to about one and one-quarter parts of peroxygen compound to about one part of acid to about one and one-third parts of peroxygen compound. Thus, from about 12 to 20 grams of sulfamic acid may be dissolved with from about 16 to 25 grams of peroxygen compound in enough water to make 100 cc. of anti-vesicant solution. Larger amounts of sulfamic acid may be employed since it results only in the production of solutions having pH values lower than 8.0. The therapeutic efficiency of such solutions is not impaired as long as the solutions are not alkaline, though an alkalizing agent such as N/10 sodium hydroxide solution may be added to prevent the pH value from becoming too low. The following examples serve to illustrate the invention:

Example I

|   | Grams |
|---|---|
| Sodium perborate peroxide | 16 |
| Sulfamic acid | 12 |

Water to make 100 cc. of solution

Example II

|   | Grams |
|---|---|
| Sodium perborate peroxide | 642 |
| Sulfamic acid | 484 |

Water to make 4000 cc. of solution

Example III

|   | Grams |
|---|---|
| Sodium perborate monohydrate | 25 |
| Sulfamic acid | 20 |

Water to make 100 cc. of solution

Example IV

|   | Grams |
|---|---|
| Sodium perborate monohydrate | 619 |
| Sulfamic acid | 486 |

Water to make 2300 cc. of solution

The therapeutic value of the anti-vesicant solutions comprising this invention have been demonstrated by tests. These tests were carried out by applying lethal doses of liquid lewisite to the depilated abdominal skin of rabbits and thereafter treating the animals with various anti-vesicant solutions at intervals of 5, 15, 30 and 60 minutes after burning. The results of these tests are summarized in the following table.

INDEX OF RELATIVE LOCAL INJURY AT VARIOUS INTERVALS BEFORE TREATMENT

|   | 5 min. | 15 min. | 30 min. | 60 min. |
|---|---|---|---|---|
| Hydrogen peroxide (8% $H_2O_2$) | 0.4 | 1.0 | 1.3 | 2.1 |
| Sodium perborate peroxide and sulfamic acid (Equivalent to 8% $H_2O_2$) | 0.8 | 1.2 | 1.4 | 1.5 |
| Sodium perborate monohydrate and sulfamic acid (Equivalent to 8% $H_2O_2$) | 0.9 | 1.3 | 1.8 | 2.8 |

It is apparent from the above tests that the peroxygen compound-sulfamic acid solutions of this invention are as effective therapeutically in neutralizing liquid lewisite as standard eight per cent aqueous hydrogen peroxide solutions. In addition to the therapeutic advantage of these compositions, there is the added advantage of economy of storage and shipping space. The solid peroxygen compounds and sulfamic acid may be packaged in Cellophane, plastic or card board containers and will occupy a minimum of space. The gas casualty field units allow a fixed small amount of space for anti-vesicants which, if utilized for packages of a solid peroxygen compound and sulfamic acid, makes available for field use a volume of anti-vesicant solution of from five to ten times the volume of eight per cent aqueous hydrogen peroxide solution which can be carried in the same space. In transporting and storing peroxygen compounds and sulfamic acid these compounds must be kept in separate containers since it has been determined that solid mixtures deteriorate rapidly, losing as much as 95 per cent of their available $H_2O_2$ in from three to five months.

Having thus described our invention, what we claim as new and wish to secure Letters Patent is:

1. An anti-vesicant preparation for the treatment of lewisite contamination of the skin, consisting of an aqueous solution of a solid peroxygen compound and sulfamic acid having a pH value of not more than pH 8 and having an available oxygen content equivalent to that of an eight per cent aqueous hydrogen peroxide solution.

2. An anti-vesicant preparation for the treatment of lewisite contamination of the skin, consisting of an aqueous solution of sodium perborate and sulfamic acid, the solution having an available oxygen content equivalent to that of an eight percent aqueous hydrogen peroxide solution.

3. An anti-vesicant preparation for the treatment of lewisite contamination of the skin containing from 16 to 25 grams of a solid peroxygen compound and from 12 to 20 grams of sulfamic acid in sufficient water to form 100 cc. of solution.

4. An anti-vesicant preparation for the treatment of lewisite contamination of the skin comprising about 16 grams of sodium perborate peroxide and from 12 to 20 grams of sulfamic acid dissolved in sufficient water to form 100 cc. of solution.

5. An anti-vesicant preparation for the treatment of lewisite contamination of the skin comprising 642 grams of sodium perborate peroxide and 484 grams of sulfamic acid dissolved in enough water to make 4000 cc. of solution.

CARL B. MARQUAND.
THOMAS W. KETHLEY.

REFERENCES CITED

The following references are of record in the file of this patent:

UNITED STATES PATENTS

| Number | Name | Date |
| --- | --- | --- |
| 975,129 | Grüter et al. | Nov. 8, 1910 |
| 975,353 | Grüter et al. | Nov. 8, 1910 |
| 2,228,483 | Raecke | Jan. 14, 1941 |

OTHER REFERENCES

Industrial & Engineering Chemistry, vol. 30, page 630 (June 1938). (Copy in S. L.)

Rushy, Bliss & Ballard, Properties and Uses of Drugs (1930), page 216. (Copy in Div. 43.)